Figure 1:
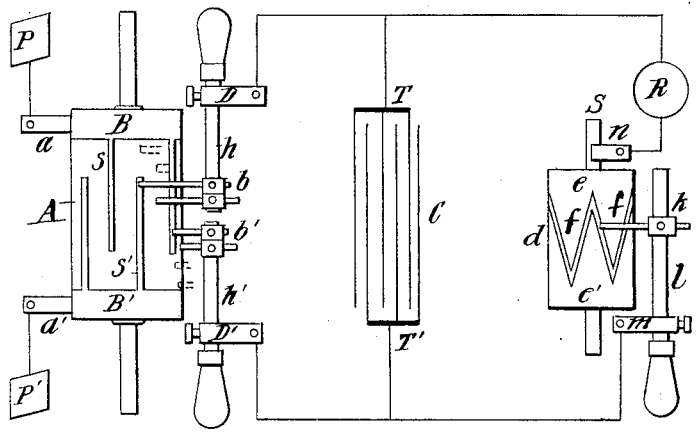

No. 685,953. Patented Nov. 5, 1901.
N. TESLA.
METHOD OF INTENSIFYING AND UTILIZING EFFECTS TRANSMITTED THROUGH NATURAL MEDIA.
(Application filed June 24, 1899. Renewed May 29, 1901.)
(No Model.)

Witnesses:
G. B. Lewis.
Hellary C. Messenger.

Nikola Tesla, Inventor
by Kerr, Page & Cooper
Att'ys

UNITED STATES PATENT OFFICE.

NIKOLA TESLA, OF NEW YORK, N. Y.

METHOD OF INTENSIFYING AND UTILIZING EFFECTS TRANSMITTED THROUGH NATURAL MEDIA.

SPECIFICATION forming part of Letters Patent No. 685,953, dated November 5, 1901.

Application filed June 24, 1899. Renewed May 29, 1901. Serial No. 62,315. (No model.)

*To all whom it may concern:*

Be it known that I, NIKOLA TESLA, a citizen of the United States, residing at New York, in the county and State of New York, have invented a new and useful Improvement in Methods of Intensifying and Utilizing Effects Transmitted Through the Natural Media, of which the following is a specification, reference being had to the accompanying drawings, which form a part of the same.

The subject of my present invention is an improvement in the art of utilizing effects transmitted from a distance to a receiving device through the natural media; and it consists in a novel method by means of which results hitherto unattainable may be secured.

Several ways or methods of transmitting electrical disturbances through the natural media and utilizing them to operate distant receivers are now known and have been applied with more or less success for accomplishing a variety of useful results. One of these ways consists in producing by a suitable apparatus rays or radiations—that is, disturbances—which are propagated in straight lines through space, directing them upon a receiving or recording apparatus at a distance, and thereby bringing the latter into action. This method is the oldest and best known and has been brought particularly into prominence in recent years through the investigations of Heinrich Hertz. Another method consists in passing a current through a circuit, preferably one inclosing a very large area, inducing thereby in a similar circuit situated at a distance another current and affecting by the same in any convenient way a receiving device. Still another way, which has also been known for many years, is to pass in any suitable manner a current through a portion of the ground, as by connecting to two points of the same, preferably at a considerable distance from each other, the two terminals of a generator and to energize by a part of the current diffused through the earth a distant circuit which is similarly arranged and grounded at two points widely apart and which is made to act upon a sensitive receiver. These various methods have their limitations, one especially, which is common to all, being that the receiving circuit or instrument must be maintained in a definite position with respect to the transmitting apparatus, which often imposes great disadvantages upon the use of the apparatus.

In several applications filed by me and patents granted to me I have disclosed other methods of accomplishing results of this nature, which may be briefly described as follows: In one system the potential of a point or region of the earth is varied by imparting to it intermittent or alternating electrifications through one of the terminals of a suitable source of electrical disturbances which, to heighten the effect, has its other terminal connected to an insulated body, preferably of large surface and at an elevation. The electrifications communicated to the earth spread in all directions through the same, reaching a distant circuit which generally has its terminals arranged and connected similarly to those of the transmitting source and operates upon a highly-sensitive receiver. Another method is based upon the fact that the atmospheric air which behaves as an excellent insulator to currents generated by ordinary apparatus becomes a conductor under the influence of currents or impulses of enormously-high electromotive force which I have devised means for generating. By such means air strata, which are easily accessible, are rendered available for the production of many desired effects at distances, however great. This method, furthermore, allows advantage to be taken of many of those improvements which are practicable in the ordinary systems of transmission involving the use of a metallic conductor.

Obviously whatever method be employed it is desirable that the disturbances produced by the transmitting apparatus should be as powerful as possible, and by the use of certain forms of high-frequency apparatus which I have devised and which are now well known important practical advantages are in this respect secured. Furthermore, since in most cases the amount of energy conveyed to the distant circuit is but a minute fraction of the total energy emanating from the source it is necessary for the attainment of the best results that whatever the character of the receiver and the nature of the disturbances as much as possible of the energy conveyed should be made available for the operation of the receiver, and with this object in view I have heretofore among other means employed a receiving-circuit of high self-induction and very small resistance and of a period such as to vibrate in synchronism with the disturbances, whereby a number of separate impulses from the source were made to coöperate, thus magnifying the effect exerted upon and insuring the action of the receiving device. By these means decided advantages have been secured in many instances; but very often the improvement is either not applicable at all or, if so, the gain is very slight. Evidently when the source is one producing a continuous pressure or delivering impulses of long duration it is impracticable to magnify the effects in this manner and when, on the other hand, it is one furnishing short impulses of extreme rapidity of succession the advantage obtained in this way is insignificant, owing to the radiation and the unavoidable frictional waste in the receiving-circuit. These losses reduce greatly both the intensity and the number of the coöperative impulses, and since the initial intensity of each of these is necessarily limited only an insignificant amount of energy is thus made available for a single operation of the receiver. As this amount is consequently dependent on the energy conveyed to the receiver by one single impulse it is evidently necessary to employ either a very large and costly, and therefore objectionable, transmitter or else to resort to the equally objectionable use of a receiving device too delicate and too easily deranged. Furthermore, the energy obtained through the coöperation of the impulses is in the form of extremely rapid vibrations and, because of this, unsuitable for the operation of ordinary receivers, the more so as this form of energy imposes narrow restrictions in regard to the mode and time of its application to such devices.

To overcome these and other limitations and disadvantages which have heretofore existed in such systems of transmission of signals or intelligence is the main object of my present invention, which comprises a novel method of accomplishing these ends.

The method, briefly stated, consists in producing arbitrarily-varied or intermittent disturbances or effects, transmitting such disturbances or effects through the natural media to a distant receiving-station, utilizing energy derived from such disturbances or effects at the receiving-station to charge a condenser, and using the accumulated potential energy so obtained to operate a receiving device.

An apparatus by means of which this method may be practiced is illustrated in the drawings hereto annexed, in which—

Figure 2:
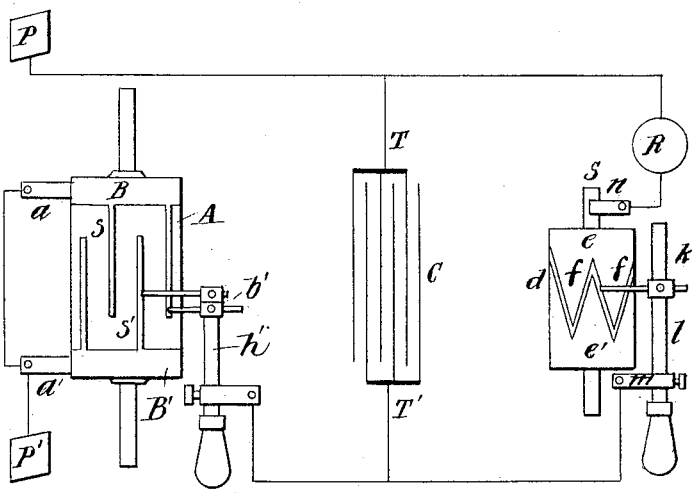

Figure 1 is a diagrammatic illustration of the apparatus, and Fig. 2 is a modified form or arrangement of the same.

In the practical application of my method I usually proceed as follows: At any two points in the transmitting medium between which there exists or may be obtained in any manner through the action of the disturbances or effects to be investigated or utilized a difference of electrical potential of any magnitude I arrange two plates or electrodes so that they may be oppositely charged through the agency of such effects or disturbances, and I connect these electrodes to the terminals of a highly-insulated condenser, generally of considerable capacity. To the condenser-terminals I also connect the receiver to be operated in series with a device of suitable construction, which performs the function of periodically discharging the condenser through the receiver at and during such intervals of time as may be best suitable for the purpose contemplated. This device may merely consist of two stationary electrodes separated by a feeble dielectric layer of minute thickness or it may comprise terminals one or more of which are movable and actuated by any suitable force and are adapted to be brought into and out of contact with each other in any convenient manner. It will now be readily seen that if the disturbances of whatever nature they may be cause definite amounts of electricity of the same sign to be conveyed to each of the plates or electrodes above mentioned, either continuously or at intervals of time which are sufficiently long, the condenser will be charged to a certain potential, and an adequate amount of energy being thus stored during the time determined by the device effecting the discharge of the condenser the receiver will be periodically operated by the electrical energy so accumulated; but very often the character of the impulses and the conditions of their use are such that without further provision not enough potential energy would be accumulated in the condenser to operate the receiving device. This is the case when, for example, each of the plates or terminals receives electricity of rapidly-changing sign or even when each receives electricity of the same sign, but only during periods which are short as compared with the intervals separating them. In such instances I resort to the use of a special device which I insert in the circuit between the plates and the condenser for the purpose of conveying to each of the terminals of the latter electrical charges of the proper quality and order of succession to enable the required amount of potential energy to be stored in the condenser.

There are a number of well-known devices, either without any moving parts or terminals or with elements reciprocated or rotated by the application of a suitable force, which offer a more ready passage to impulses of one sign or direction than to those of the other, or permit only impulses of one kind or order of succession to traverse a path, and any of these or similar devices capable of fulfilling the requirements may be used in carrying my invention into practice. One such device of familiar construction which will serve to convey a clear understanding of this part of my invention and enable a person skilled in the art to apply the same is illustrated in the annexed drawings. It consists of a cylinder A of insulating material, which is moved at a uniform rate of speed by clockwork or other suitable motive power and is provided with two metal rings B B', upon which bear brushes $a$ and $a'$, which are connected, respectively, in the manner shown to the terminal plates P and P', above referred to. From the rings B B' extend narrow metallic segments $s$ and $s'$, which by the rotation of the cylinder A are brought alternately into contact with double brushes $b$ and $b'$, carried by and in contact with conducting-holders $h$ and $h'$, which are adjustable longitudinally in the metallic supports D and D', as shown. The latter are connected to the terminals T and T' of a condenser C, and it should be understood that they are capable of angular displacement, as ordinary brush-supports. The object of using two brushes, as $b$ and $b'$, in each of the holders $h$ and $h'$ is to vary at will the duration of the electric contact of the plates P and P' with the terminals T and T', to which is connected a receiving-circuit including a receiver R and a device $d$ of the kind above referred to, which performs the duty of closing the receiving-circuit at predetermined intervals of time and discharging the stored energy through the receiver. In the present case this device consists of a cylinder $d$, made partly of conducting and partly of insulating material $e$ and $e'$, respectively, which is rotated at the desired rate of speed by any suitable means. The conducting part $e$ is in good electrical connection with the shaft S and is provided with tapering segments $ff$, upon which slides a brush $k$, supported on a conducting-rod $l$, capable of longitudinal adjustment in a metallic support $m$. Another brush $n$ is arranged to bear upon the shaft S, and it will be seen that whenever one of the segments $f$ comes in contact with the brush $k$ the circuit, including the receiver R, is completed and the condenser discharged through the same. By an adjustment of the speed of rotation of the cylinder $d$ and a displacement of the brush $k$ along the cylinder the circuit may be made to open and close in as rapid succession and remain open or closed during such intervals of time as may be desired. The plates P and P', through which the electrifications are conveyed to the brushes $a$ and $a'$, may be at a considerable distance from each other and both in the ground or both in the air, or one in the ground and the other in the air, preferably at some height, or they may be connected to conductors extending to some distance or to the terminals of any kind of apparatus supplying electrical energy which is obtained from the energy of the impulses or disturbances transmitted from a distance through the natural media.

In illustration of the operation of the devices described let it be assumed that alternating electrical impulses from a distant generator, as G, are transmitted through the earth and that it is desired to utilize those impulses in accordance with my method. This may be the case, for example, when such a generator is used for purposes of signaling in one of the ways before enumerated, as by having its terminals connected to two points of the earth distant from each other. In this case the plates P and P' are first connected to two properly-selected points of the earth. The speed of rotation of the cylinder A is varied until it is made to turn in synchronism with the alternate impulses of the generator, and, finally, the position of the brushes $b$ and $b'$ is adjusted by angular displacement, as usual, or in other ways, so that they are in contact with the segments $s$ and $s'$ during the periods when the impulses are at or near the maximum of their intensity. Only ordinary electrical skill and knowledge are required to make these adjustments, and a number of devices for effecting synchronous movement being well known, and it being the chief object of my present application to set forth a novel method of utilizing or applying a principle, a detailed description of such devices is not considered necessary. I may state, however, that for practical purposes in the present case it is only necessary to shift the brushes forward or back until the maximum effect is secured. The above requirements being fulfilled, electrical charges of the same sign will be conveyed to each of the condenser-terminals as the cylinder A is rotated, and with each fresh impulse the condenser will be charged to a higher potential. The speed of rotation of the cylinder $d$ being adjustable at will, the energy of any number of separate impulses may thus be accumulated in potential form and discharged through the receiver R upon the brush $k$ coming in contact with one of the segments $f$. It will be of course understood that the capacity of the condenser should be such as to allow the storing of a much greater amount of energy than is required for the ordinary operation of the receiver. Since by this method a relatively great amount of energy and in a suitable form may be made available for the operation of a receiver, the latter need not be very sensitive; but of course when the impulses are very feeble, as when coming from a great distance or when it is desired to operate a receiver very rapidly, then any of the well-known devices capable of responding to very feeble influences may be used in this connection.

If instead of the alternating impulses short impulses of the same direction are conveyed to the plates P and P', the apparatus described may still readily be used, and for this purpose it is merely necessary to shift the brushes $b$ and $b'$ into the position indicated by the dotted lines while maintaining the same conditions in regard to synchronism as before, so that the succeeding impulses will be permitted to pass into the condenser, but prevented from returning to the ground or transmitting medium during the intervals between them, owing to the interruption during such intervals of the connections leading from the condenser-terminals to the plates.

Another way of using the apparatus with impulses of the same direction is to take off one pair of brushes, as $b$, disconnect the plate P from brush $a$ and join it directly to the terminal T of the condenser, and to connect brush $a$ with brush $a'$. The apparatus thus modified would appear as shown in Fig. 2. Operated in this manner and assuming the speed of rotation of cylinder A to be the same, the apparatus will now be evidently adapted for a number of impulses per unit of time twice as great as in the preceding case. In all cases it is evidently important to adjust the duration of contact of segments $s$ and $s'$ with brushes $b$ $b'$ in the manner indicated.

When the method and apparatus I have described are used in connection with the transmission of signals or intelligence, it will of course be understood that the transmitter is operated in such a way as to produce disturbances or effects which are varied or intermitted in some arbitrary manner—for example, to produce longer and shorter successions of impulses corresponding to the dashes and dots of the Morse alphabet—and the receiving device will respond to and indicate these variations or intermittences, since the storage device will be charged and discharged a number of times corresponding to the duration of the successions of impulses received.

Obviously the special appliances used in carrying out my invention may be varied in many ways without departing from the spirit of the same.

It is to be observed that it is the function of the cylinder A, with its brushes and connections, to render the electrical impulses coming from the plates P and P' suitable for charging the condenser (assuming them to be unsuitable for this purpose in the form in which they are received) by rectifying them when they are originally alternating in direction or by selecting such parts of them as are suitable when all are not, and any other device performing this function will obviously answer the purpose. It is also evident that a device such as I have already referred to which offers a more ready passage to impulses of one sign or permits only impulses of the same sign to pass may also be used to perform this selective function in many cases when alternating impulses are received. When the impulses are long and all of the same direction, and even when they are alternating, but sufficiently long in duration and sustained in electromotive force, the brushes $b$ and $b'$ may be adjusted so as to bear on the parts B B' of the cylinder A, or the cylinder and its brushes may be omitted and the terminals of the condenser connected directly to the plates P and P'.

It will be seen that by the use of my invention results hitherto unattainable in utilizing disturbances or effects transmitted through natural media may be readily attained, since however great the distance of such transmission and however feeble or attenuated the impulses received enough energy may be accumulated from them by storing up the energy of succeeding impulses for a sufficient interval of time to render the sudden liberation of it highly effective in operating a receiver. In this way receivers of a variety of forms may be made to respond effectively to impulses too feeble to be detected or to be made to produce any sensible effect in any other way of which I am aware, a result of great value in various applications to practical use.

I do not claim herein an apparatus by means of which the above-described method is or may be practiced either in the special form herein shown or in other forms which are possible, having made claims to such apparatus in another application, Serial No. 729,812, filed September 8, 1899, as a division of the present case.

What I claim as my invention, and desire to secure by Letters Patent, is—

1. The method of transmitting and utilizing electrical energy herein described, which consists in producing arbitrarily varied or intermitted electrical disturbances or effects, transmitting the same to a distant receiving-station, charging, for succeeding and predetermined periods of time a condenser with energy derived from such effects or disturbances, and operating a receiving device by discharging at arbitrary intervals, the accumulated potential energy so obtained, as set forth.

2. The method of transmitting and utilizing electrical energy herein described, which consists in producing electrical disturbances or effects capable of being transmitted to a distance through the natural media, charging a condenser at a distant receiving-station with energy derived from such effects or disturbances, and using for periods of time, predetermined as to succession and duration, the potential energy so obtained to operate a receiving device.

3. The method of transmitting and utilizing electrical energy herein described, which consists in producing electrical disturbances or effects capable of being transmitted to a distance through the natural media, charging a condenser at a distant receiving-station for succeeding and predetermined periods of time, with energy derived from such effects or disturbances, and using for periods of time predetermined as to succession and duration, the accumulated energy so obtained to operate a receiving device.

4. The method hereinbefore described of producing arbitrarily varied or intermitted electrical disturbances or effects, transmitting such disturbances or effects through the natural media to a distant receiving-station, storing in a condenser energy derived from a succession of such disturbances or effects for periods of time which correspond in succession to such effects or disturbances and are predetermined as to duration, and using the accumulated potential energy so obtained to operate a receiving device.

5. The method herein described of producing arbitrarily varied or intermitted electrical disturbances or effects, transmitting such disturbances or effects through the natural media to a distant receiving-station, establishing thereby a flow of electrical energy in a circuit at such station, charging a condenser with energy from such circuit, and using the accumulated potential energy so obtained to operate a receiving device.

6. The method herein described of producing arbitrarily varied or intermitted electrical disturbances or effects, transmitting such disturbances or effects through the natural media to a distant receiving-station, establishing thereby a flow of electrical energy in a circuit at such station, charging a condenser with electrical energy from such circuit, and discharging the accumulated potential energy so obtained into or through a receiving device at arbitrary intervals of time.

7. The method herein described of producing arbitrarily varied or intermitted electrical disturbances or effects, transmitting such disturbances or effects to a distant receiving-station, establishing thereby a flow of electrical energy in a circuit at such station, selecting or directing the impulses in said circuit so as to render them suitable for charging a condenser, charging a condenser with the impulses so selected or directed, and discharging the accumulated potential energy so obtained into, or through a receiving device.

8. The method herein described of producing arbitrarily varied or intermitted electrical disturbances or effects, transmitting such disturbances or effects through the natural media to a distant receiving-station, establishing thereby a flow of electrical energy in a circuit at such station, selecting or directing the impulses in said circuit so as to render them suitable for charging a condenser, charging a condenser with the impulses so selected or directed, and discharging the accumulated potential energy so obtained into, or through a receiving device at arbitrary intervals of time.

9. The method hereinbefore described of transmitting signals or intelligence, which consists in producing at the sending-station arbitrarily varied or intermitted disturbances or effects, transmitting such disturbances or effects through the natural media to a receiving-station, utilizing energy derived from such disturbances or effects at the receiving-station to charge a condenser and using the accumulated potential energy so obtained to operate a receiving device.

10. The method hereinbefore described of transmitting signals or intelligence through the natural media from a sending-station to a receiving-station, which consists in producing at the sending-station, arbitrarily varied or intermitted electrical effects or disturbances, transmitting the same through the natural media to the receiving-station, utilizing the energy derived from such disturbances or effects at the receiving-station to charge a condenser, and discharging the accumulated potential energy so obtained through a receiving device at arbitrary intervals of time.

11. The method hereinbefore described of transmitting signals or intelligence from a sending to a distant receiving station, which consists in producing at the former, arbitrarily varied or intermitted electrical disturbances or effects, transmitting the same to the receiving-station, charging by the energy derived from such disturbances or effects at the receiving-station a condenser, and using for periods of time predetermined as to succession and duration, the potential energy so obtained to operate a receiving device, as set forth.

NIKOLA TESLA.

Witnesses:
LEONARD E. CURTIS,
A. E. SKINNER.